United States Patent [19]

Gardner et al.

[11] 4,366,642
[45] Jan. 4, 1983

[54] VERMIN TRAP

[76] Inventors: Brian R. Gardner; Loraine P. Gardner, both of 59 St. Patrick's Ave., Kuraby, Australia, 4112

[21] Appl. No.: 230,296

[22] Filed: Jan. 30, 1981

[30] Foreign Application Priority Data

Feb. 1, 1980 [AU] Australia ............................. PE2215

[51] Int. Cl.³ ............................................. A01M 23/30
[52] U.S. Cl. ............................................. 43/82; 43/88
[58] Field of Search .................................. 43/81–83.5, 43/85, 88, 61, 77

[56] References Cited

U.S. PATENT DOCUMENTS

| 2,506,055 | 5/1950 | Benson | 43/85 |
| 2,581,327 | 1/1952 | Knox | 43/82 |
| 4,122,625 | 10/1978 | Ohtsuka | 43/82 |
| 4,142,320 | 3/1979 | Marcolina et al. | 43/61 |
| 4,231,180 | 11/1980 | Bare | 43/61 |

Primary Examiner—Nicholas P. Godici
Assistant Examiner—Charles L. Willis
Attorney, Agent, or Firm—Schwartz, Jeffery, Schwaab, Mack, Blumenthal & Koch

[57] ABSTRACT

A trap for mice or other small animals has an open-topped box-like base to which are hinged a striker and a combined bait holder and retainer, an elastic band tensioned between the striker and base urging the striker down from a raised or set position to striking position, entering the base, the retainer being releasably engageable with the striker to hold it in set position until the bait holder is depressed to free the striker to be driven to striking position, the base, the striker and the bait holder and retainer being assembled from a single blank of sheet material, the striker and the bait holder and retainer being hinged to the base along bend lines in this material.

4 Claims, 4 Drawing Figures

VERMIN TRAP

BACKGROUND OF THE INVENTION

This invention relates to an improved vermin trap, for mice and other small animals.

A very common type of mouse trap has a rectangular wooden base, a length of resilient wire being shaped to form a rectangular striker, which is hinged to the base, and a tension spring urging the striker down onto the front of the base. The stiker may be swung through about 180°, against the action of the spring to "set" position, near the back of the base, and held in this position by a retainer hinged at one end to the base, overlying the striker, and releasably engaged at the other end by a bait holder, on which bait may be fixed. When the bait holder is depressed by a mouse taking the bait, the retainer is released to free the striker, which is swung rapidly down to the front of the base, by the spring, to strike and kill the mouse.

Many people find it distasteful to remove killed mice from traps, and the general object of the present invention is to provide a trap for mice or other small animals which is particularly simple and economical to manufacture and which may be disposable so that, after it has killed a mouse, for example, it may be disposed of together with the killed animal, which need not be removed from the trap.

BRIEF SUMMARY OF THE INVENTION

A trap according to the present invention is of the type having a base, a striker hinged to the base, actuating means adapted to urge the striker towards the base, a retainer adapted to hold the striker releasably in a set position clear of the base, and a bait holder which, when depressed, causes the retainer to disengage the striker, which is then free to be moved by the actuating means to striking position close to the base, the base, striker, retainer and bait holder all being formed integrally of a blank of sheet material such as fibreboard, the striker, and also a single part forming the retainer and bait holder, being hinged to the base along weakened or bend lines in the sheet material, the actuating means being an elastic band stretched between the striker and the base.

BRIEF DESCRIPTION OF THE DRAWINGS

In order that a preferred embodiment of the invention may be readily understood and carried into practical effect, reference is now made to the accompanying drawings, wherein.

DESCRIPTION OF THE PREFERRED EMBODIMENT

Figure 1:
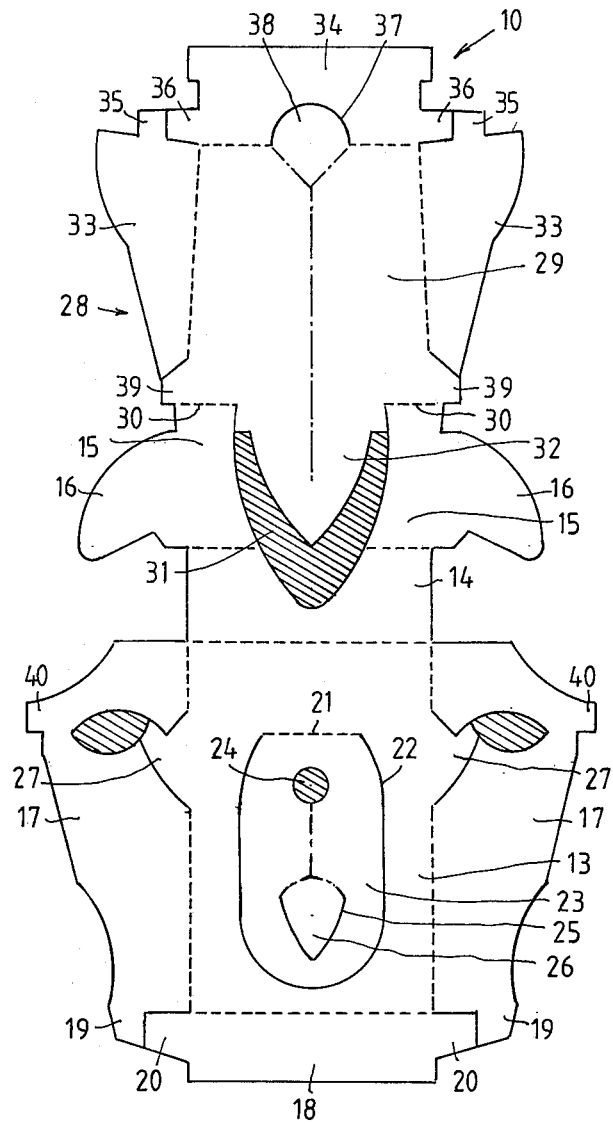
FIG. 1 illustrates a blank of sheet material from which a trap is assembled.

The blank 10 shown in FIG. 1 is preferably of thin but tough corrugated-core fibreboard, and it is formed with cuts, indicated by unbroken lines, right through the board; with weakened or bend lines, which may be cut part-way through the board, and which are indicated by regularly broken lines; with compression lines, pressed into the board without cutting, and indicated by chain-broken lines, and with excisions, which are shown cross-hatched.

Figure 2:
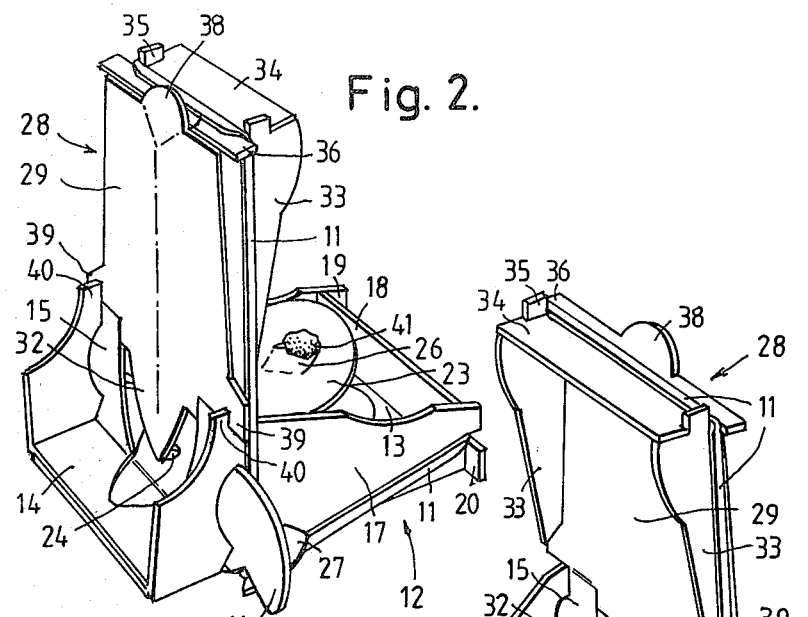
FIGS. 2 and 3 are perspective views of a trap assembled from the blank of FIG. 1 and a rubber or like band, and in set position.
Figure 3:
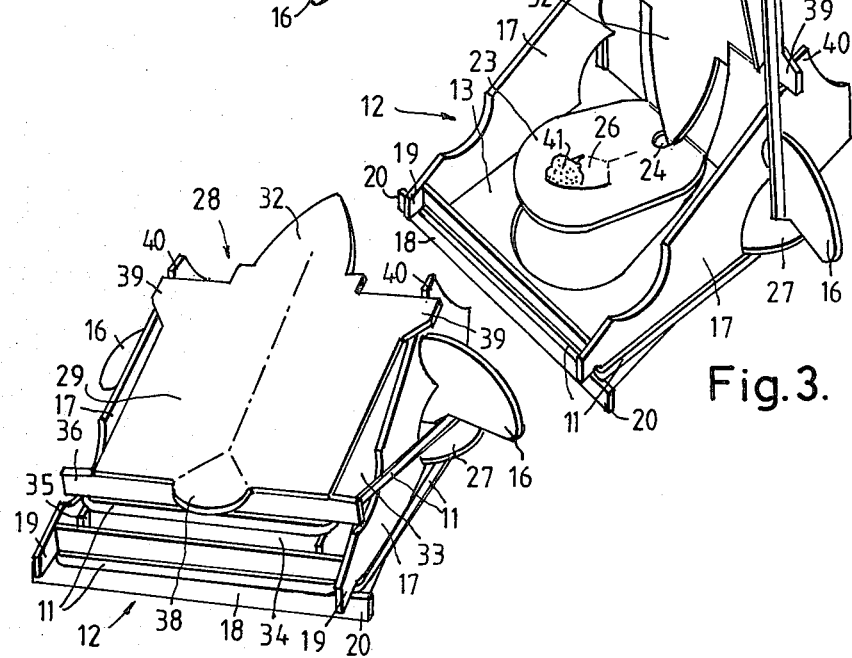
Figure 4:
FIG. 4 is a perspective view of the trap in closed or sprung position.

From the blank 10, and a rubber band 11, the mouse trap shown in FIGS. 2, 3 and 4 is assembled. The trap has a box-like base 12 with a rectangular bottom 13 which at the rear is doubled over to form a double-thickness rear section 14. The base 12 also has a back piece 15 extending up from the front of the rear section 14 and with a pair of side extensions 16; a pair of side pieces 17 with openings through which the side extensions 16 are passed; and a front piece 18, the side pieces 17 having forwardly extending lugs 19 which overlie lugs 20 extending laterally from the sides of the front piece 18.

A bend line 21 and a U-shaped cut 22 through the base bottom 13 define a retainer and bait holder 23 from which a hole 24 is excised near to the bend line, and in which a V-shaped cut 25 defines a small jaw 26. The base bottom 13 has a pair of notched lateral extensions 27.

The striker 28 of the trap is an extension of the base back piece 15, and includes a striker back piece 29 hinged to the base back piece 15 along bend lines 30, a V-shaped excision 31 between the bend lines 30 and extending through the base back piece 15 and rear section 14 defining a striker tongue 32 which terminates in a point and is a rigid extension of the striker back piece 29. The striker has a pair of side pieces 33 and a front end piece 34, all of which are bent perpendicularly to the back piece 29, lugs 35 extending from the side pieces 33 interfitting with lugs 36 extending laterally from the front end piece 34. A semi-circular cut 37 in the blank 10 defined a lifting tab 38 protruding from the striker back piece 29, and a Y-shaped compression line from the ends of this semi-circular cut to the point of the striker tongue imparts rigidity to the lifting tab and tongue.

A pair of lateral extensions 39 from the striker back piece 29 are so disposed that, when the striker 28 is raised hingedly to "set" position, as shown in FIGS. 2 and 3, they are brought against a pair of stop lugs 40 extending up from the base side pieces 17, to prevent the striker from being hinged back beyond its set position perpendicular to the base bottom 13, and to ensure that the hinged connection of the striker to the base does not move rearwards.

The trap may be baited by pressing down the jaw 26 of the retainer and bait holder 23 and inserting a piece of appropriate bait, as indicated at 41, between the retainer and bait holder and its jaw 26.

The trap is set or loaded by stretching the rubber band 11 across the striker front end piece 34, down behind the lugs 35 and in front of the lugs 36 and along the striker side pieces 33, in front of the striker extensions 39 and the base side extensions 16, through the notches of the notched lateral extensions 27 of the base bottom 13, forwardly along the base side pieces 17 and across the base front piece 18, above the front piece lugs 20 and under the side piece lugs 19. The tensioned rubber band serves to hold firmly together the side and end pieces of both the base 12 and the striker 28.

When the striker 28 is raised hingedly to its upright or set position, by means of the lifting tab 38, the rubber band 11 is further tensioned, and by raising the retainer and bait holder 23, which is easily accessible through the hole in the base bottom 13 from which the bait holder has been pressed, the point of the striker tongue 32 may be easily engaged in the hole 24 in the retainer and bait holder, which thus is held frictionally in its raised position.

If a mouse, in attempting to take the bait 41, depresses the retainer and bait holder to even a very small extent, the striker tongue 32 will be freed from the hole 24, and the striker will be brought sharply down by the tensioned rubber band to its closed or sprung position, as shown in FIG. 4, killing the mouse, with its head enclosed in the trap. As shown in FIG. 4, the dimensions of the box-like striker 28 are such that its lower part fits fairly closely within the box-like base 12, and so the mouse will be struck forcibly whether it approaches the bait from the front or either side, the configuration of the parts preventing any approach to the bait from the back. Although the trap is light, it is not likely to be tipped over by a mouse approaching the bait from a side, owing to the side extensions 16.

Traps according to the invention will be found to be very effective in achieving the objects for which they have been devised, being capable of being manufactured very simply and economically and, in the form of blanks, able to be compactly packaged for storage, transport and sale. A trap may be quickly and easily assembled from a blank and rubber band and, when a mouse has been caught in it, the trap and killed mouse may be disposed of without the necessity of removing the mouse from the trap.

We claim:

1. A vermin trap of the type having a base, a striker hinged to the base, actuating means urging the striker to a striking position near to the base, a retainer adapted to hold the striker releasably in a set position removed from the striking position, and a bait holder adapted, when depressed, to cause the retainer to disengage the striker, freeing it for movement by the actuating means to its striking position, wherein:

the retainer and the bait holder consist of a member hinged to the base,
   the base, the striker and the retainer and bait holder are formed integrally of a blank of sheet material,
   the striker and the retainer and bait holder being hinged to the base along weakened lines in the sheet material.

2. A vermin trap according to claim 1 wherein:
   the actuating means comprises an elastic band tensioned between the striker and the base.

3. A vermin trap according to claim 1 wherein:
   the base is box-like, comprising a bottom piece, and side, front and back pieces hingedly connected thereto,
   the striker includes a top piece hingedly connected to the base back piece, and front and side pieces hingedly connected to said top piece, and
   the striker is adapted, when moved to its striking position, to enter the box-like base.

4. A vermin trap according to claim 3 wherein:
   the retainer and bait holder is defined by a substantially U-shaped cut through the bottom piece of the base, and
   the striker includes a tongue extending from its top piece and adapted, when the striker is in its set position, to engage in an aperture in the retainer and bait holder when said retainer and bait holder is raised hingedly above the base bottom piece, to hold the striker releasably in said set position.

* * * * *